(12) United States Patent
Desire et al.

(10) Patent No.: US 9,895,976 B2
(45) Date of Patent: Feb. 20, 2018

(54) INDUCTIVE PICK-UP ARRANGEMENT FOR AN ELECTRIC VEHICLE AND METHOD OF OPERATING AN ELECTRIC VEHICLE

(71) Applicant: Bombardier Transportation GmbH, Berlin (DE)

(72) Inventors: Bertrand Desire, Dunkerque (FR); Sonja Boedt, Gistel (BE); Stefan Lischke, Wallhausen OT Riethnordhausen (DE)

(73) Assignee: Bombardier Transportation GmbH, Berlin (DE)

( * ) Notice: Subject to any disclaimer, the term of this patent is extended or adjusted under 35 U.S.C. 154(b) by 158 days.

(21) Appl. No.: 14/400,109

(22) PCT Filed: May 13, 2013

(86) PCT No.: PCT/EP2013/059842
§ 371 (c)(1),
(2) Date: Nov. 10, 2014

(87) PCT Pub. No.: WO2013/167757
PCT Pub. Date: Nov. 14, 2013

(65) Prior Publication Data
US 2015/0090552 A1    Apr. 2, 2015

(30) Foreign Application Priority Data

May 11, 2012 (GB) .................................. 1208387.9

(51) Int. Cl.
*B60L 5/42* (2006.01)
*B60L 5/00* (2006.01)
(Continued)

(52) U.S. Cl.
CPC ............. *B60L 5/005* (2013.01); *B60L 11/182* (2013.01); *B60L 11/1833* (2013.01);
(Continued)

(58) Field of Classification Search
CPC .... B60L 5/00; B60L 5/005; B60L 5/34; B60L 5/36; B60L 5/38; B60L 5/42; B60L 9/00
See application file for complete search history.

(56) References Cited

U.S. PATENT DOCUMENTS 3,914,562 A    10/1975 Bolger
5,595,271 A    1/1997 Tseng
(Continued)

FOREIGN PATENT DOCUMENTS

CN    102050034 A    5/2011
CN    102405580 A    4/2012
(Continued)

*Primary Examiner* — Robert J McCarry, Jr.
(74) *Attorney, Agent, or Firm* — The Webb Law Firm

(57) ABSTRACT

The invention relates to an inductive pick-up to be mounted on an electric vehicle, operated with electric energy produced by the inductive pick-up by magnetic induction. The inductive pick-up includes a pick-up portion, a mounting portion, and an actuator. The invention also relates to an electric land vehicle including an inductive pick-up mounted at the bottom of the vehicle. The invention also relates to a method of operating an electric vehicle having an inductive pick-up portion.

15 Claims, 8 Drawing Sheets

(51) Int. Cl.
  *B60L 11/18* (2006.01)
  *B62D 21/02* (2006.01)
(52) U.S. Cl.
  CPC ....... *B60L 2200/26* (2013.01); *B60L 2270/40* (2013.01); *B62D 21/02* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 5,821,728 | A | 10/1998 | Schwind |
| 2010/0200316 | A1 | 8/2010 | Gurol et al. |
| 2011/0233018 | A1 | 9/2011 | Richards |
| 2011/0285349 | A1* | 11/2011 | Widmer ................ B60L 11/182 320/108 |
| 2012/0103741 | A1 | 5/2012 | Suh et al. |

FOREIGN PATENT DOCUMENTS

| | | |
|---|---|---|
| CN | 102448764 A | 5/2012 |
| DE | 3900700 A1 | 8/1989 |
| WO | 2007108586 A1 | 9/2007 |
| WO | 2010042777 A2 | 4/2010 |
| WO | 2010076976 A2 | 7/2010 |
| WO | 2010098547 A2 | 9/2010 |
| WO | 2010128263 A1 | 11/2010 |
| WO | 2011045883 A1 | 4/2011 |

* cited by examiner

INDUCTIVE PICK-UP ARRANGEMENT FOR AN ELECTRIC VEHICLE AND METHOD OF OPERATING AN ELECTRIC VEHICLE

CROSS-REFERENCE TO RELATED APPLICATIONS

This application is the United States national phase of International Application No. PCT/EP2013/059842 filed May 13, 2013, and claims priority to United Kingdom Patent Application No. 1208387.9 filed May 11, 2012, the disclosures of which are hereby incorporated in their entirety by reference.

BACKGROUND OF THE INVENTION

Field of the Invention

The invention relates to an inductive pick-up arrangement to be mounted on an electric vehicle which shall be operated with electric energy produced by the arrangement by magnetic induction. Furthermore, the invention relates to an electric land vehicle, in particular a road automobile or a rail vehicle, comprising the inductive pick-up arrangement. In addition, the invention relates to a method of operating an electric vehicle using the inductive pick-up arrangement.

Description of Related Art

Electric land vehicles may be provided with energy in different manners. One option is to charge an energy storage on-board the vehicle while the vehicle stops and by using an electric cable connection. According to another option, the energy is transferred to the vehicle in a wireless manner using a magnetic field which induces an electric voltage in at least one inductance on-board the vehicle. The expression "pick-up" has been used for the device which comprises at least one inductance.

An example is described in U.S. Pat. No. 3,914,562. The document describes an electrically driven vehicle having suitable batteries to drive the vehicle on conventional roads. The vehicle has means for receiving power from a conductor embedded in a prepared roadway for driving the vehicle and for charging the batteries. The power receiving means on-board the vehicle, i.e. the pick-up, which are mounted at the bottom of the vehicle, can be lowered towards the surface of the road in order to reduce the size of the air gap between the pick-up and the conductor embedded in the roadway. The pick-up comprises a pick-up core including a central elevated section and a pair of lateral sections disposed closer to the road which serve as magnetic poles. A pick-up coil is wound about the central core section. A pick-up position control automatically or manually adjusts the position of the pick-up relative to the roadway. The pick-up position control comprises a pair of relays for energizing an electric motor of the means for raising and lowering the pick-up. These raising and lowering means include a linkage connecting the framework of the vehicle to suitable bracing elements secured to the pick-up core. Two sets of bell crank arms are connected to the bracing elements and to a double ended reciprocating output member provided by the motor. The arms are mounted by pivot pins to the vehicle framework.

The raising and lowering means described in U.S. Pat. No. 3,914,562 require a large space with respect to the vertical direction. Therefore, the pick-up and the raising and lowering means need to be taken into account in the conceptual design of the vehicle. Alteration of an existing vehicle, i.e. mounting a pick-up and a corresponding lifting device, requires extensive effort or is impossible, if the vehicle is not yet designed to be operated using such a pick-up.

SUMMARY OF THE INVENTION

It is an object of the present invention to provide an inductive pick-up arrangement which can be mounted to electric vehicles, which are not designed to be operated using such a pick-up arrangement, wherein the effort for alteration shall be low. It is a further object of the invention to provide an electric land vehicle, in particular a road automobile or a rail vehicle, which comprises the pick-up arrangement. In addition, it is an object of the present invention to provide a method of operating an electric vehicle using an inductive pick-up arrangement.

According to a basic idea of the present invention, the arrangement comprises an actuator having a prolongable section which can be prolonged and shortened by operating the actuator. The prolongable section extends from a first bearing which is attached to the vehicle's frame to a second bearing which is attached to the pick-up. By prolonging or shortening the prolongable section, the pick-up is moved in vertical direction.

Optionally, the arrangement can comprise a plurality of prolongable sections of this kind.

In any case, independent of the number of prolongable sections used in the arrangement, the space which is required for mounting and operating the prolongable section(s) is small compared to other constructions such as the construction described in U.S. Pat. No. 3,914,562.

In particular, an inductive pick-up arrangement is proposed that is to be mounted on an electric vehicle which shall be operated with electric energy produced by the arrangement by magnetic induction, wherein:

the arrangement comprises a pick-up portion comprising at least one electric inductance for receiving a magnetic field and for producing the electric energy, the arrangement comprises a mounting portion to be mounted on the vehicle, the arrangement comprises an actuator for actuating movement of the pick-up portion relative to the mounting portion, the mounting portion and the pick-up portion are moveably connected to each other by at least two connecting portions, a distance from the pick-up portion to the mounting portion in a vertical direction can be varied by the actuator, the actuator comprises a prolongable section which can be prolonged and shortened by operating the actuator and which extends from a first bearing attached to the mounting portion to a second bearing attached to the pick-up portion, the prolongable section comprises a first operating state in which the prolongable section is shorter than in a second operating state, so that the distance from the pick-up portion to the mounting portion is smaller in one of the first and second operating states than in the other of the first and the second operating states.

Furthermore, an electric land vehicle is proposed, in particular a road automobile or a rail vehicle, comprising the pick-up arrangement according to any embodiment described here, wherein the arrangement is mounted at the bottom of the vehicle, so that the pick-up portion can be moved by the actuator between a lower position, in which the distance between the pick-up portion and the mounting portion is larger, and a higher position, in which the distance between the pick-up portion and the mounting portion is smaller.

In addition, a method is proposed of operating an electric vehicle, in particular a road automobile or a rail vehicle, wherein:

- an inductive pick-up portion, which is moveably connected to a mounting portion that is mounted at the bottom of the electric vehicle, is moved using an actuator between a lower position, in which the distance between the pick-up portion and the mounting portion is larger, and a higher position, in which the distance between the pick-up portion and the mounting portion is smaller,
- movement of the pick-up portion relative to the mounting portion is guided using at least two connecting portions which connect the pick-up portion and the mounting portion,
- a prolongable section of the actuator, which prolongable section extends from a first bearing attached to the mounting portion to a second bearing attached to the pick-up portion, is prolonged or shortened while operating the actuator,
- by prolonging or shortening the prolongable section the distance from the pick-up portion to the mounting portion is varied.

In particular, the pick-up portion comprises at least one coil of at least one electric line, so that the coil forms an inductance for receiving the magnetic field and for producing electric energy by induction. For example, the pick-up portion may comprise a plurality of coils, wherein at least two of the coils may be connected in series to each other and/or at least two of the coils may be connected in parallel to each other.

The mounting portion which is to be mounted to the vehicle may be an integral part of the frame construction of the vehicle. In this case, there is no need for an additional mounting portion in order to mount the pick-up arrangement to the vehicle. However, the invention is particularly suitable for alteration of existing vehicles. In this case, an additional mounting portion can be mounted on the vehicle so that the pick-up arrangement is mounted. Alternatively, an existing frame construction of the vehicle can be altered so that it forms the mounting portion. For example, at least some beams of the frame construction may be removed and the frame construction may be reinforced in other regions of the frame so that the pick-up portion fits in the mounting portion while being in the highest possible position. Generally, it is preferred that the mounting portion comprises a receiving area for receiving the pick-up portion or at least for receiving a part of the pick-up portion, wherein the received pick-up portion or part of the pick-up portion extends within the same range in vertical direction as the mounting portion. For example, the mounting portion may extend around the receiving area so that the receiving area forms a cavity within the mounting portion. In any case, a receiving area which is located at the same height level as the mounting portion reduces the required space in vertical direction.

As mentioned above, the arrangement comprises an actuator and the actuator is used for actuating movement of the pick-up portion relative to the mounting portion. The actuator may be driven by any suitable means, such as an electromotor or a set of electromotors. However, it would alternatively or in addition be possible to use hydraulic or pneumatic means for driving movement of the pick-up portion relative to the mounting portion.

The mounting portion and the pick-up portion are movably connected to each other by at least two connecting portions. Generally speaking, the connecting portions or one connecting portion may be identical to the prolongable section of the actuator. In this case, the actuator or actuators has/have not only the function of moving the pick-up portion, but are also designed to carry weight of the pick-up portion.

However, it is preferred that there are two connecting portions in addition to at least one prolongable portion of the actuator or set of actuators. In this case, the connecting portions carry at least some of the weight of the pick-up portion. Examples will be described later.

The pick-up portion may, for example, be a monolithic body. According to a specific embodiment, the pick-up portion may have a flat rectangular shape, i.e. may be a cuboid having a height which is smaller than the length and depth. In particular, at the outer periphery of the cuboid, the bearing or bearings can be mounted for connecting the prolongable section(s) and/or the connecting portion(s).

The distance from the pick-up portion to the mounting portion in the vertical direction can be varied by the actuator, i.e. by prolonging or shortening the prolongable section of the actuator. In particular, the distance between the pick-up portion and the mounting portion can become zero, especially in the case mentioned above, wherein the mounting portion comprises a receiving area for receiving the pick-up portion.

In principle, prolonging the prolongable section may result in either lifting up (according to a first embodiment) or lowering (according to a second embodiment of the arrangement) the pick-up portion. Therefore, the first operating state of the prolongable section in which the prolongable section is shorter than in a second operating state, may be the operating state in which the distance from the pick-up portion to the mounting portion is small or zero or may be the operating state in which the distance from the pick-up portion to the mounting portion is large. Of course, the prolongable section may have more operating states which correspond to other values of the distance, if there is not only a high position and a low position of the pick-up portion relative to the mounting portion. For example, as described in U.S. Pat. No. 3,914,562, the distance may be varied continuously or on demand if there is an obstruction on the roadway of a road automobile.

According to a preferred embodiment each of the at least two connecting portions extends from a third bearing attached to the mounting portion to a fourth bearing attached to the pick-up portion, thereby connecting the mounting portion and the pick-up portion to each other, and wherein a first one of the at least two connecting portions and a second one of the least two connecting portions are spaced apart from each other in a horizontal direction, so that the mounting portion, the pick-up portion, the first connecting portion and the second connecting portion form a parallelogram-like configuration. This corresponds to an embodiment of the method, wherein the parallelogram-like configuration guides movement of the pick-up portion relative to the mounting portion.

If the two connecting portions do not have the function of the prolongable section of the actuator, in particular if the two connecting portions or the respective connecting portion is not prolongable, the third bearing and the first bearing fall in different categories of bearings.

The same applies to the fourth bearing and the second bearing. If there are two connecting portions which are not prolongable sections or do not comprise prolongable sections, there are two separate third bearings and two separate fourth bearings. The words "first", "second", "third" and "fourth" are therefore not used to count the number of bearings, but are used to represent different categories of bearings.

Preferably, there are more than two connecting portions. For example, in the case of the pick-up portion being a rectangular cuboid (such as mentioned above), two connecting portions and the respective bearings may be located on the two opposite sides of the cuboid. At least if the pick-up portion is in a position where the distance between the pick-up portion and the mounting portion is not zero and the pick-up portion is in a lower position than the mounting portion, the connecting portions extend downwards from their third bearing to their fourth bearing.

In any case, two connecting portions which are spaced apart from each other in a horizontal direction, so that the mounting portion, the pick-up portion, the first connecting portion and the second connecting portion form a parallelogram-like configuration, has the advantage, that the pick-up portion can be lifted and lowered while having exactly the same orientation towards the underground. This is useful, since the at least one inductance of the pick-up portion typically has properties depending on the orientation. For example, the ability of converting magnetic flux of a magnetic field to electric voltage in the line or lines of the coils of the pick-up depends on the orientation of the coil or coils. In particular, in the case of a flat rectangular cuboid being the pick-up portion, the direction normal to the lower surface of the cuboid can be oriented in the vertical direction or, more generally speaking, in the direction which is also normal to the surface of the track on which the vehicle travels or stands, i.e. the lower surface in parallel to the surface of the track.

If the corresponding connecting portion is not prolongable, it does not only carry at least part of the weight of the pick-up, but it also guides the movement of the pick-up portion relative to the mounting portion. In particular, the third and fourth bearings may allow for rotational movement of the respective end region of the connecting portion relative to the mounting portion or pick-up portion around a horizontal axis. Therefore, the fourth bearing moves on a circular line around the axis of rotation of the third bearing while the pick-up portion is lifted or lowered by the actuator. Of course, the same applies if the axes of rotation are not or not exactly oriented in horizontal direction.

The first and second bearing which preferably connect respective opposite end sections of the prolongable section of the actuator with the mounting portion or the pick-up portion, may allow for rotational movement of the end section relative to the mounting portion or pick-up portion. In particular, especially if the axes of rotation of the third and fourth bearings are oriented in horizontal direction, the axes of rotation of the first and second bearing may also be oriented in a horizontal direction. In particular, all horizontal directions may be parallel. However, these horizontal directions are oriented transverse to the horizontal direction in which the two connecting portions are spaced apart from each other.

Preferably, the first bearing and the second bearing are positioned at a distance to each other which distance has a component that extends in the horizontal direction (this horizontal direction may be the same horizontal direction in which the first and second connecting portions are spaced apart from each other or a parallel direction) and which varies during operation of the actuator. The term "component" means that the straight linear connecting line, which connects the first bearing with the second bearing, can be considered as a vector and the horizontal component of the vector has a length which is equal to the distance of the first and second bearings in the horizontal direction. The straight linear connecting line is an imaginary line which not necessarily coincides with a longitudinal axis of the prolongable section of the actuator. Since the pick-up is lifted up or lowered by prolonging or shortening the prolongable section, the length of the vector varies correspondingly and, therefore, the horizontal and the vertical component of the vector (i.e. the horizontal and the vertical distance of the first and second bearings) vary. For example, the vertical component of the vector may be zero or nearly zero while the pick-up portion is in the highest possible position relative to the mounting portion.

According to a configuration that will be described with reference to the attached drawings the directions of rotation around the first and third bearings and as well the second and fourth bearings are the opposite rotational directions, i.e. the end region of the prolongable section of the actuator and the end region of the connecting portion, which are attached to the same portion of the arrangement (either the mounting portion or the pick-up portion) rotate in the opposite direction if compared to each other and referred to the respective axis of rotation of their bearing, while the pick-up portion is moved relative to the mounting portion.

This corresponds to a special embodiment in which the distance from the pick-up portion to the mounting portion is smaller in the first operating state (in which the prolongable section is shorter) than in the second operating state (in which the prolongable section is longer). This means that prolonging the prolongable section lowers the pick-up portion relative to the mounting portion and vice versa.

Preferably, the prolongable section is adapted to be prolonged and shortened in the direction of a straight linear axis which extends from the first bearing to the second bearing. Another term for such an actuator having a prolongable section is "linear actuator". One example of such a linear actuator is a linear electromotor. Another example is a hydraulically or pneumatically actuated piston/cylinder unit having a piston which is linearly movable relative to the cylinder which guides movement of the piston. A preferred example of such a linear actuator is an actuator having a screw drive which is moved using an electromotor. The difference compared to a linear electromotor is that the screw drive is driven by an electromotor having an armature which rotates during operation. Screw drives can transfer particularly high mechanical forces compared to other linear actuators and are highly reliable. An example of such a linear actuator is the "Electrak" type (either DC or AC powered) offered by Thomson Industries, Inc., 1500 Mittel Blvd., Wood Dale, Ill. 60191, United States of America.

Preferably, the arrangement comprises a locking mechanism adapted to lock the pick-up portion in a predefined position relative to the mounting portion. A corresponding embodiment of the method comprises locking the pick-up portion in a predefined position relative to the mounting portion. In particular, the predefined position may be the higher position, in which the distance between the pick-up portion and the mounting portion is smaller. For example, the higher position may be the highest possible position of the pick-up portion.

Furthermore, it is preferred that the actuator is an electric actuator and is switched off while the pick-up portion is locked in the predefined position.

In particular, the locking mechanism may comprise at least one reception for receiving a locking element (such as a moveable bolt). While the reception receives the locking element, they are engaged and the predefined position of the pick-up portion is thereby locked. The reception may be part of the pick-up portion and the locking element may be part of the mounting portion, or vice versa.

According to an embodiment, the reception is a cut-out, a recess or a loop in a section of the pick-up portion.

Preferably, the locking element is moveable in a direction transverse to the direction of movement in which the actuator and/or the pick-up portion move(s) for bringing the pick-up portion in the predefined position.

In addition, it is preferred that the locking mechanism is combined with a detector device for detecting if the pick-up portion is in the predefined position and/or if the pick-up portion is actually locked by the locking mechanism.

BRIEF DESCRIPTION OF THE DRAWINGS

Examples of the invention will be described with reference to the attached figures. The figures show.

DESCRIPTION OF THE INVENTION

Figure 1:
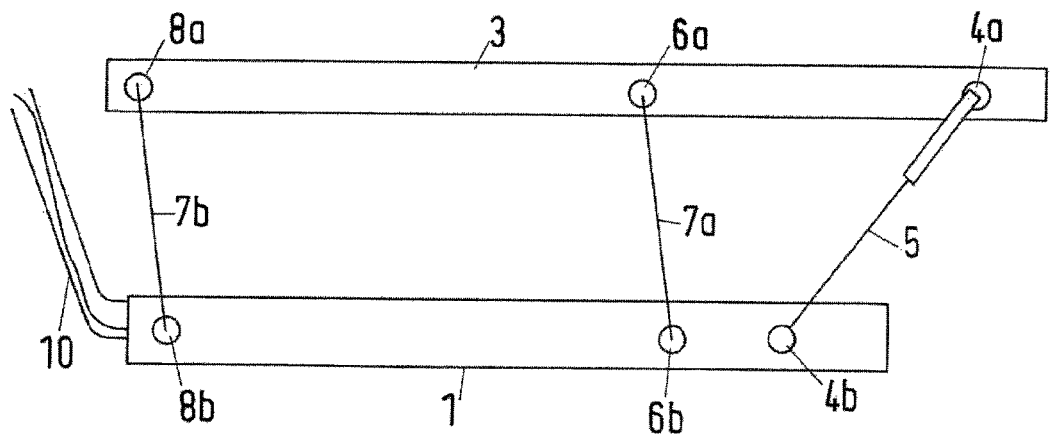
FIG. 1 a schematic side view of a pick-up arrangement.

FIG. 1 shows the principle of an embodiment of a pick-up arrangement. The mounting portion 3 may be attached to the frame of a vehicle and/or may be part of the vehicle frame. Two connecting portions 7a, 7b are movably connected to the mounting portion 3 via third bearings 6a, 8a.

A pick-up portion 1 having the shape of a flat rectangular cuboid is movably connected to opposite ends of the connecting portions 7a, 7b via fourth bearings 6b, 8b. The mounting portion 3, the connecting portions 7a, 7b and the pick-up portion 1 form a parallelogram-like configuration, wherein the angles at the corners of the parallelogram vary while the pick-up portion 1 is lowered or lifted up.

An actuator for effecting movement of the pick-up portion 1 relative to the mounting portion 3 comprises a linearly movable, prolongable section 5. A first end of the prolongable section 5 is movably attached to the mounting portion 3 via a first bearing 4a. The opposite end of the prolongable section 5 is movably connected to the pick-up portion 1 via a second bearing 4b.

The movable connections of all bearings 4, 6, 8 in FIG. 1 are rotatable connections, wherein the axis of rotation is fixed relative to the mounting portion 3 with respect to bearings 4a, 6a, 8a and is fixed with respect to the pick-up portion 1 with respect to the bearings 4b, 6b, 8b.

When the prolongable section 5 is shortened, the pick-up portion 1 is lifted up towards the mounting portion 3. During lifting up and the same applies to the lowering of the pick-up portion 1, the first ends of the connecting portions 7a, 7b which are movably connected via third bearings 6a, 8a to the mounting portion 3, rotate in the opposite direction around their rotating axis compared to the rotational movement of the first end of the prolongable section 5. The same applies to the second ends of the connecting portions 7a, 7b on one hand and of the prolongable section 5 on the other hand.

An electric cable 10 which is connected to the pick-up portion 1 (in particular to several coils of the pick-up portion 1) is shown on the left hand side of FIG. 1. The cable 10 is connected to the opposite end in horizontal direction compared to the end region where the second end of the prolongable section 5 is connected. It is generally preferred that any electric cable for connecting the pick-up portion to other devices of the vehicle is connected at the opposite end compared to the end of the prolongable section of the actuator.

Figure 2:
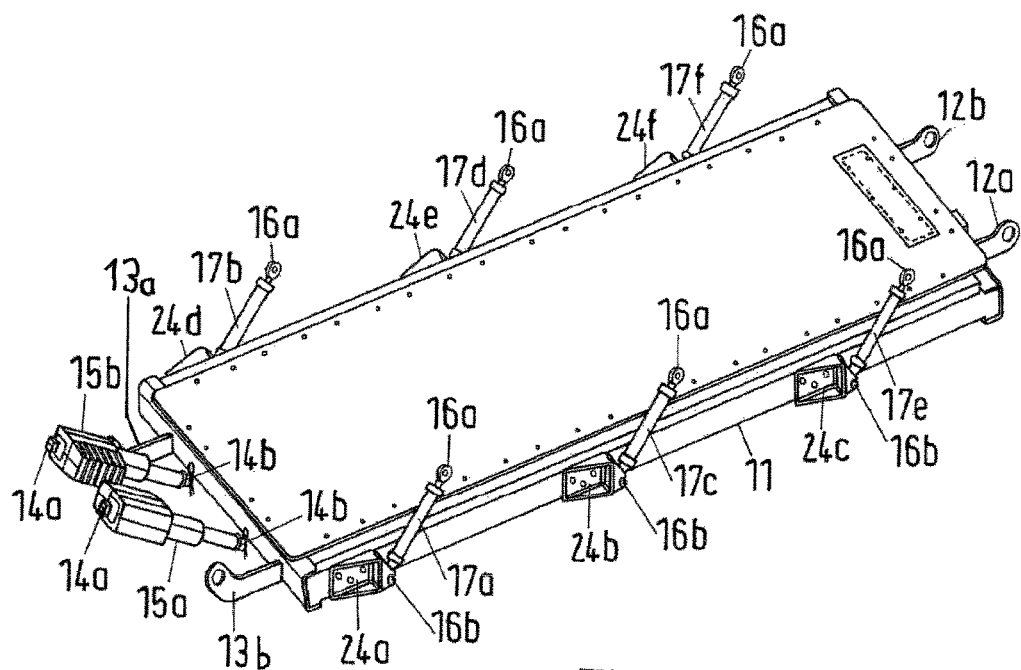
FIG. 2 a three-dimensional illustration of a preferred embodiment of a pick-up, including two actuators and six connecting portions, FIG. 3 a side view showing the pick-up portion of FIG. 2 connected to a mounting portion in a lowered position of the pick-up portion, FIG. 4 a side view of the arrangement shown in FIG. 3, wherein the pick-up portion is lifted up to the highest possible position, where the pick-up portion is fully received by a receiving area of the mounting portion, FIG. 5 a three-dimensional illustration of a framework of a vehicle which comprises the mounting portion, such as the mounting portion of FIG. 3 and FIG. 4 or a similar mounting portion, FIG. 6 the framework of FIG. 5 to which the arrangement of FIG. 2 or a similar arrangement is mounted, wherein two different relative positions of the pick-up portion and the framework are shown, i.e. the movable parts of the arrangement are shown in duplicate, FIG. 7 the arrangement of FIG. 6 from a different angle of view, namely from the underside of the arrangement, FIG. 8 a three-dimensional view of a region of the pick-up portion and of parts of a locking mechanism which are to be connected with the mounting portion, FIG. 9 a three-dimensional view of a different region of the same pick-up portion shown in FIG. 8 or of a region of a different pick-up portion, also showing parts of a locking mechanism which are to be fixed to the mounting portion, FIG. 10 a bottom view of a region similar to the region shown in FIG. 9, but concerning a mirror-inverted situation, FIG. 11 a bottom view of the situation shown in FIG. 9, FIG. 12 a bottom view of the mirror-inverted situation shown in FIG. 8 and FIG. 13 schematically, a bolt of a locking mechanism which engages a protruding part of the pick-up portion.
Figure 3:
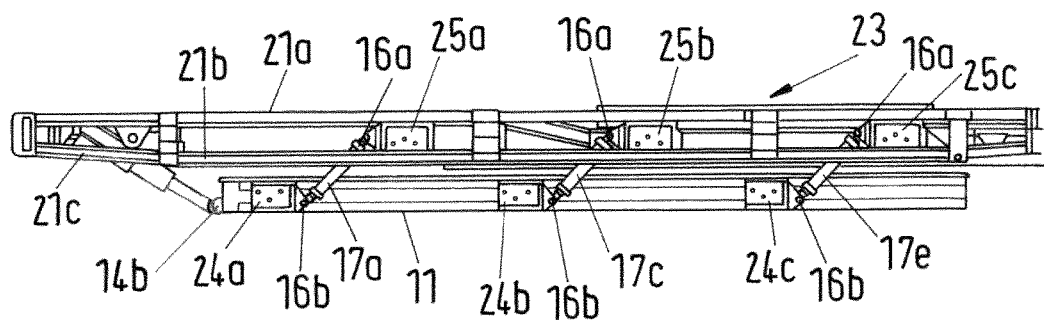
Figure 4:
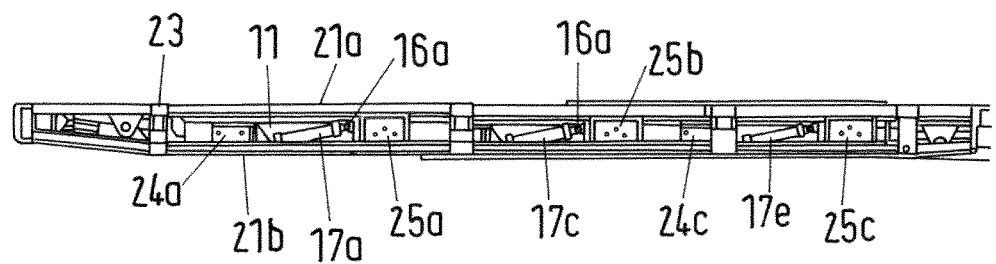

In the specific embodiment shown in FIG. 2 to FIG. 7, the pick-up portion 11 or 11a is also shaped as a flat rectangular cuboid. However, there are two actuators 15a, 15b provided for moving the pick-up portion relative to the mounting portion, which is not shown in FIG. 2. The actuators 15a, 15b are arranged in parallel to each other. Each of the actuators 15a, 15b is movably mounted via in each case one first bearing 14a to the mounting portion 23, which is shown in FIG. 3 and FIG. 4. The opposite, second end of the actuator 15a, 15b is movably connected to the pick-up portion 11 or 11a via in each case one second bearing 14b.

The embodiment shown in FIG. 2 to FIG. 4 comprises six movable connections and respective bearings 16b to connecting portions 17a-17f. These fourth bearings 16b are connected to a lateral surface of the pick-up portion 11 via fixing profiles 24a-24f. There are three connecting portions 17a, 17c, 17e and 17b, 17d, 17f on either side of the pick-up portion 11. The upper, first ends of the connecting portions 17 are connected via third bearings 16a to the mounting portion 23. Each pair of neighboring connecting portions 17 on either side of the pick-up portion 11 form, together with the pick-up portion and the mounting portion a parallelogram shaped configuration.

The protruding parts 12a, 12b and 13a, 13b shown in FIG. 2 are fixed to the narrow sides of the flat rectangular cuboid, extend away from their fixed end and comprise a circular cut-out at their free end. As will be explained later, the cut-out or eye can be used to lock the pick-up portion in its position.

Figure 6:
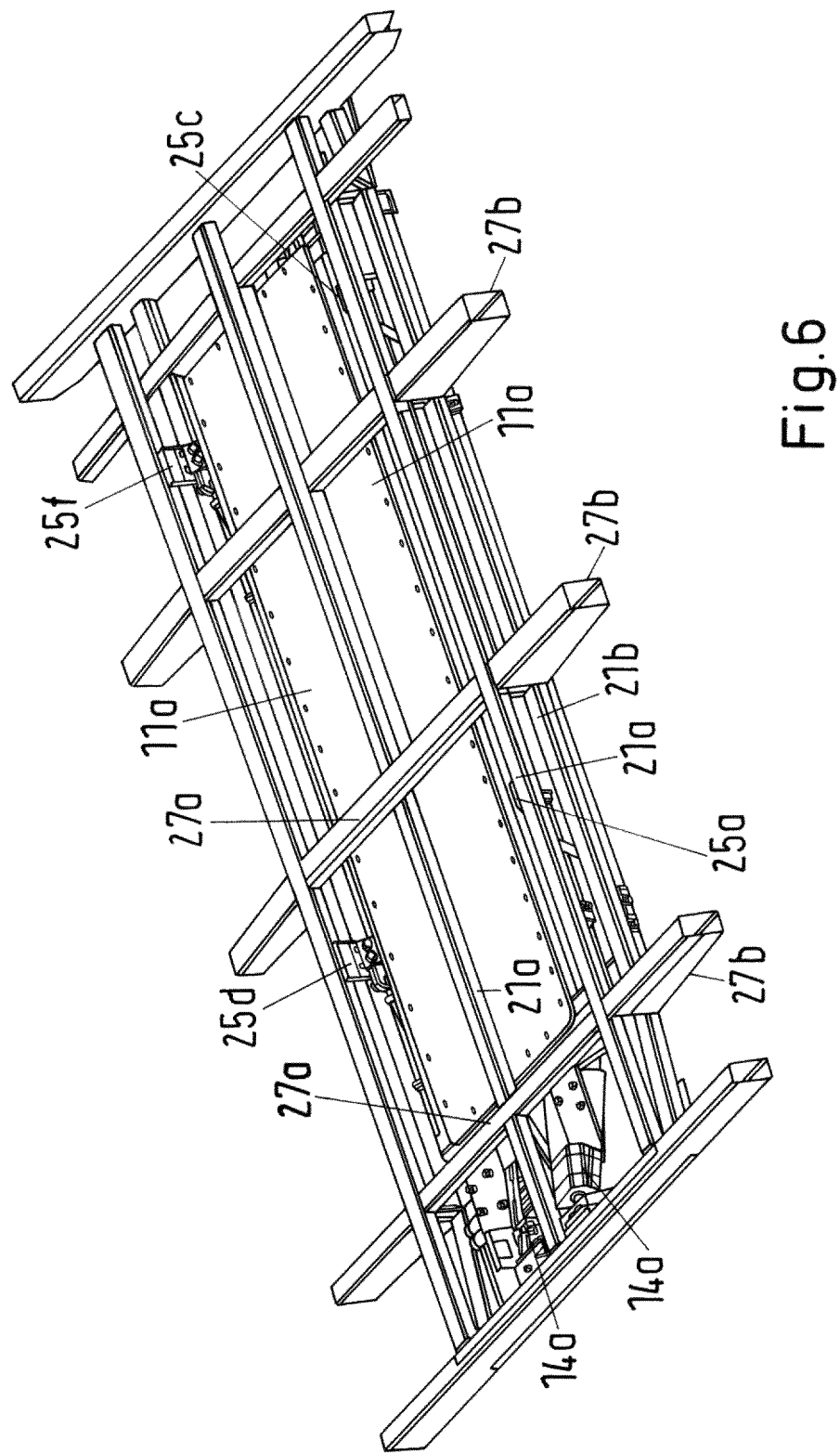
Figure 7:
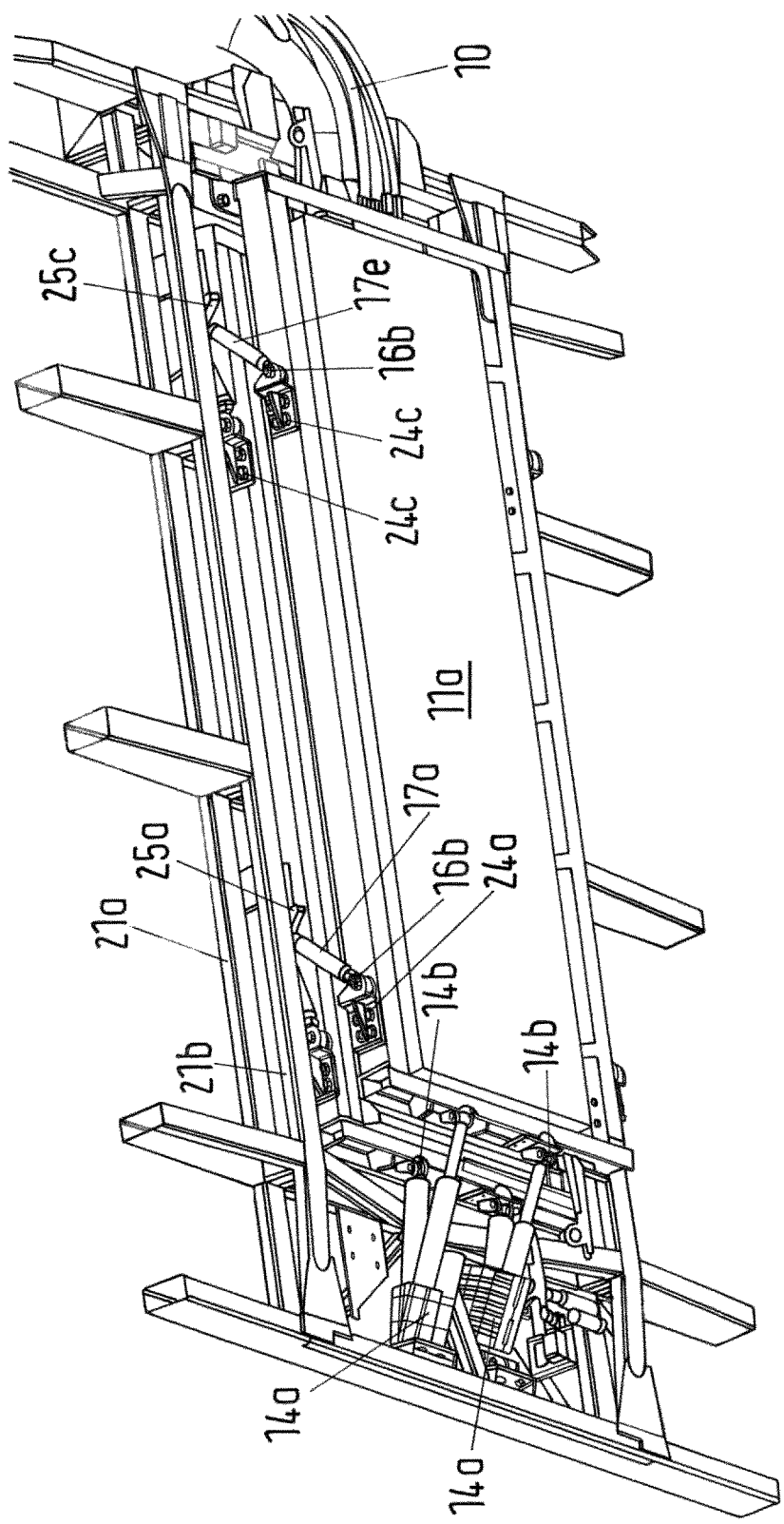

In the embodiment shown in FIG. 6 and FIG. 7, the connecting portions 17c, 17d in the middle of either side of the pick-up are omitted. Consequently, there is only one parallelogram shaped configuration on either side of the pick-up portion 11a.

Figure 5:
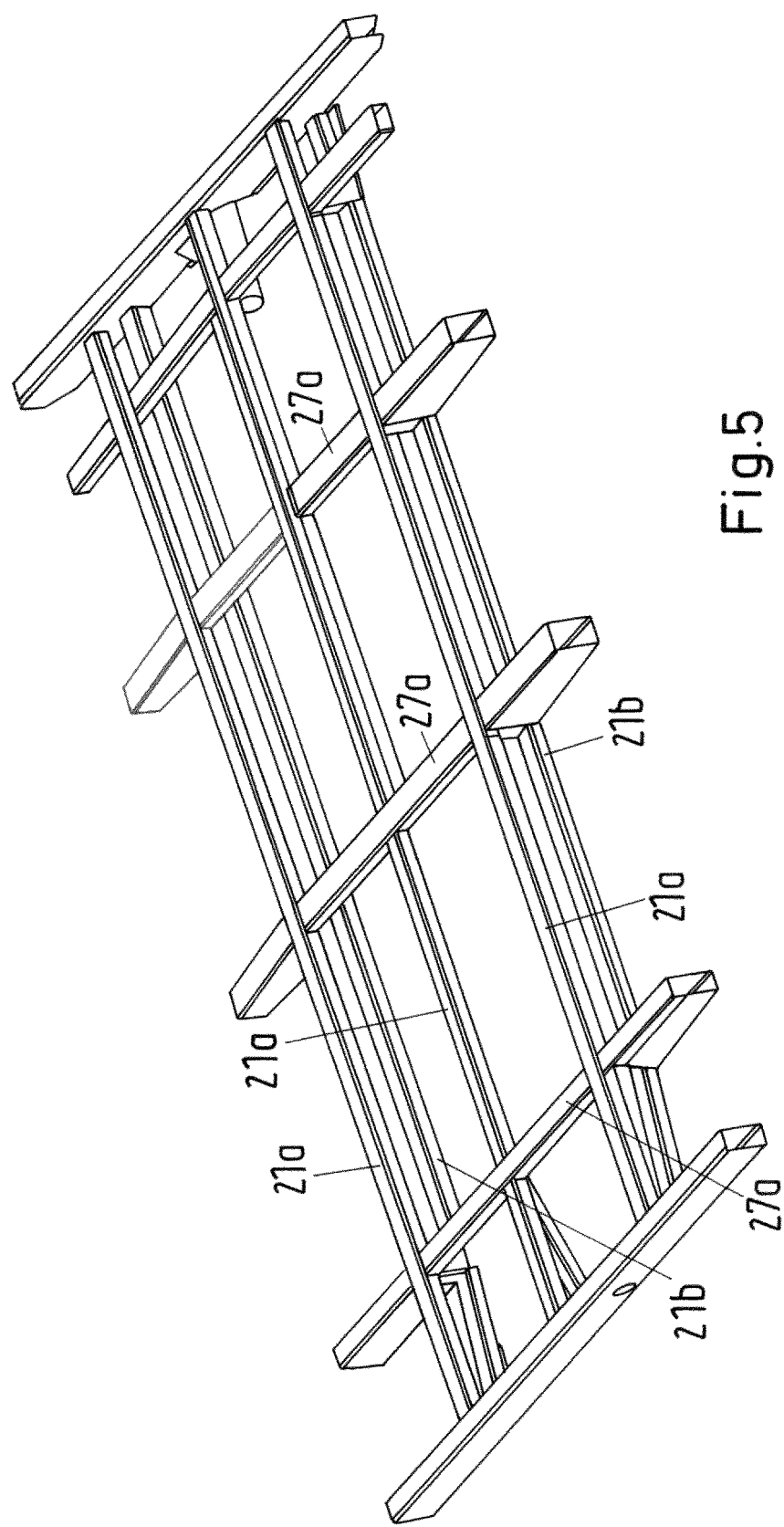

The mounting portion 23 shown in FIG. 3 and FIG. 4 is a framework construction comprising several beams which are firmly connected to each other. A specific embodiment is shown in FIG. 5-FIG. 7. Upper longitudinal beams 21a which extend in the longitudinal direction of the arrangement, lower longitudinal beams 21b and cross beams 27a, extending also in horizontal direction as the longitudinal beams 21a, 21b, but perpendicular to the longitudinal beams 21, are connected to the framework shown. Not all elements of the framework will be described here. Optionally, diagonal beams can be added which connect longitudinal beams and/or cross beams for reinforcement.

The mounting portion 23 comprises a receiving area (for example as shown in FIG. 7) which receives the pick-up portion 11a in its highest possible position. For existing framework constructions of vehicles, such a receiving area can be generated by removing some beams from the receiving area and by reinforcing the framework construction in other regions, if necessary.

The third bearings 16a of the connecting portions 17 are fixed to the framework construction by elements 25a, 25c, 25d, 25f which are preferably fixed to upper longitudinal beams 21a as well as lower longitudinal beams 21b. FIG. 5-7 only show four of the elements 25, since the embodiment of the pick-up portion 11a is connected to the mounting portion 23 via four connecting portions 17. The side views of FIGS. 3 and 4 show three of the elements 25a, 25b, 25c on the same side, i.e. total number of the elements 25 is six in this embodiment.

FIG. 3 shows the pick-up portion 11 in a lower position compared to the highest possible position shown in FIG. 4, in which the pick-up portion 11 is fully received by the receiving area of the mounting portion 23.

In the example shown in FIG. 5 to FIG. 7, a lid 29 covers a corresponding opening on the upper side of the framework. If the lid 29 is opened, the receiving area and the pick-up portion 11a can be accessed through the opening.

FIG. 6 and FIG. 7 show the pick-up portion 11a, the actuators 14a and the connecting portions 17a, 17e in duplicate, because the pick-up portion 11a is shown in two different positions relative to the mounting portion.

In the following, the locking of the pick-up portion is described with reference to the FIG. 8 to FIG. 13. In these figures, the same reference numerals are used for similar parts having the same function.

Figure 8:
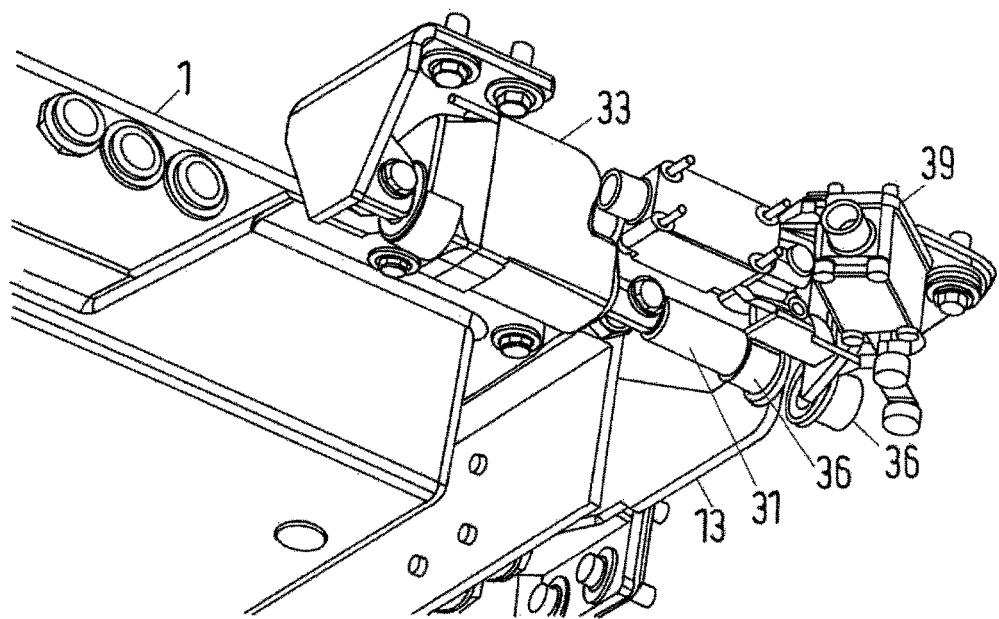

FIG. 8 shows a pick-up portion 1, to which a protruding part 13 is fixed. Part 13 shown in FIG. 8 has the same function as protruding parts 12a, 12b and 13a, 13b shown in FIG. 2. However, protruding parts 13 of FIG. 8 to FIG. 13 comprise a recess which is open to the bottom while protruding parts 12, 13 shown in FIG. 2 comprise an eye. The recess and the eye serve to receive a locking element, such as a bolt, for locking the pick-up portion in the position.

FIG. 8 is a three-dimensional view of a corner region of the pick-up portion 1 from below looking upwards in a sloped direction. In the upper right region of the figure, different parts of a locking mechanism are shown: a locking drive 33, which may be actuated electrically or electromagnetically, a bolt 31, which is driven by the locking drive 33, a pair of tubular sleeves 36 for receiving the bolt 31, and a detector 39 for detecting if the pick-up portion 1 is in a predefined position in which the pick-up portion 1 can be locked. This enables the arrangement to check if the locking mechanism can be actuated in order to lock or unlock the pick-up portion 1. Alternatively or in addition, the detector may be adapted to detect if the pick-up portion is locked.

If the pick-up portion 1 is in the position shown in FIG. 8 in which the pick-up portion 1 can be locked, the detector 39 detects the position. In any case, if there is a detector or no detector and independent of the function of the detector, the bolt 31 can be moved by the locking drive 33 in the direction of the longitudinal axis of the bolt 31 so that the bolt 31 not only penetrates the left sleeve 36, but also penetrates the right sleeve 36 shown in FIG. 8. However, FIG. 8 shows the state in which the bolt 31 only penetrates the left sleeve 36.

Figure 9:
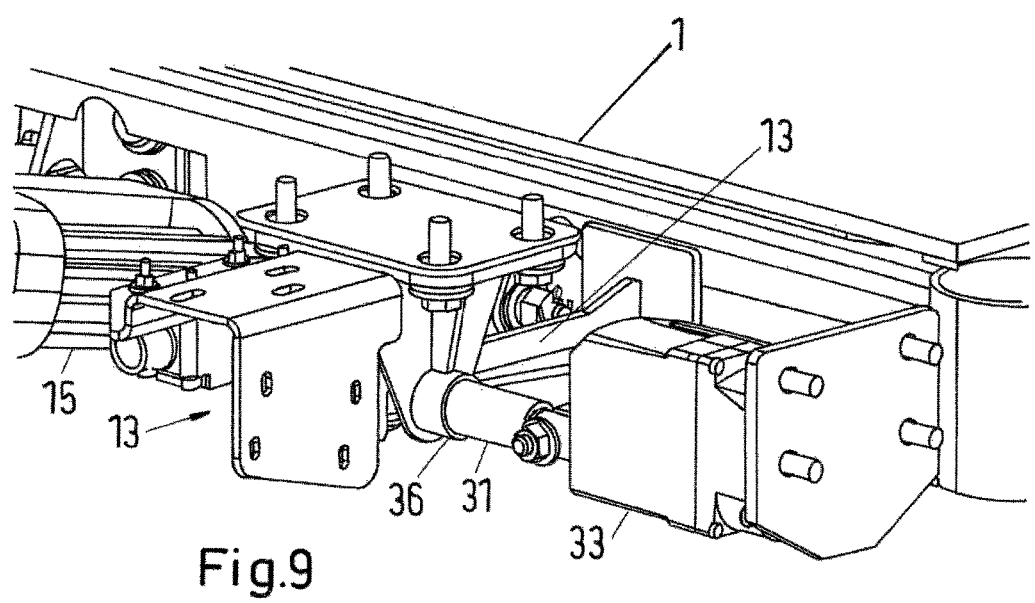

FIG. 9 is a three-dimensional view of a different region or different arrangement viewing in a direction from slightly above the region shown. Again, there is a locking drive 33 for driving a bolt 31 in a straight linear direction, i.e. for pushing and retracting the bolt 31. In addition, there is a holder 35 for holding the sleeves 36 (only one sleeve is shown in FIG. 9). Furthermore, the region below the holder 35, which is the region where the protruding part 13 receives the bolt 31, is not visible in FIG. 9 since it is covered by the holder 35 and parts which are attached to the holder. FIG. 9 also shows a part of an actuator 15 which can actuate movement of the pick-up portion 1 relative to the mounting portion. The parts of the locking mechanism are fixed to the mounting portion, with the exception of the protruding part 13 which is also a part of the locking mechanism and is fixed to the pick-up portion.

Figure 10:
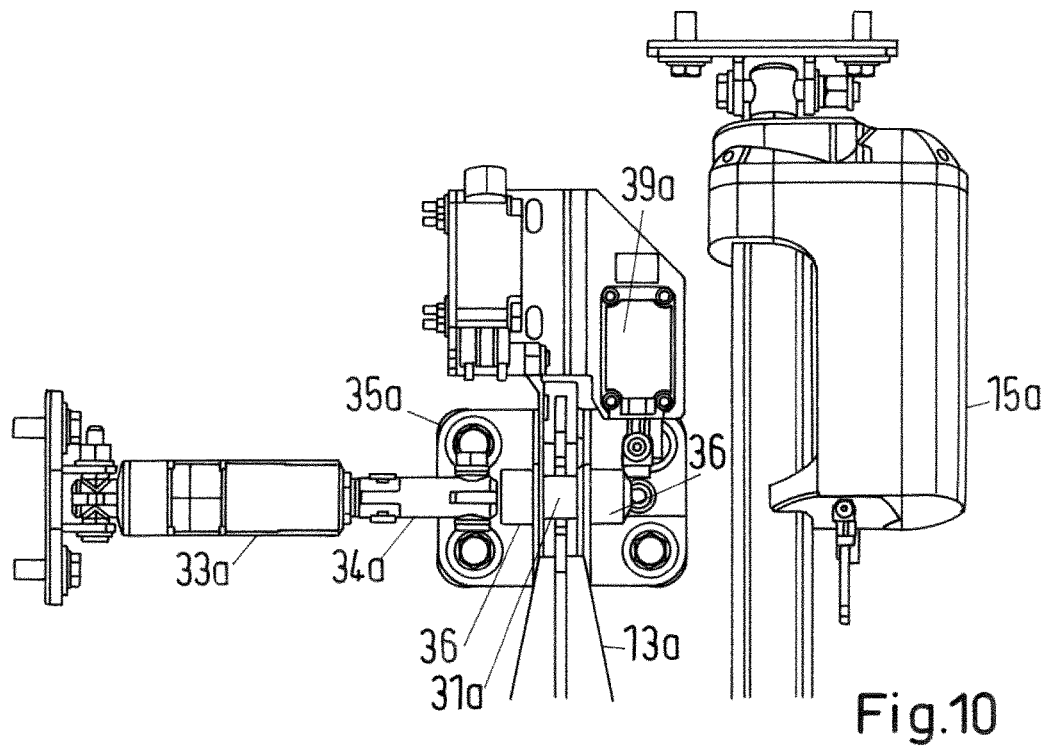
Figure 11:
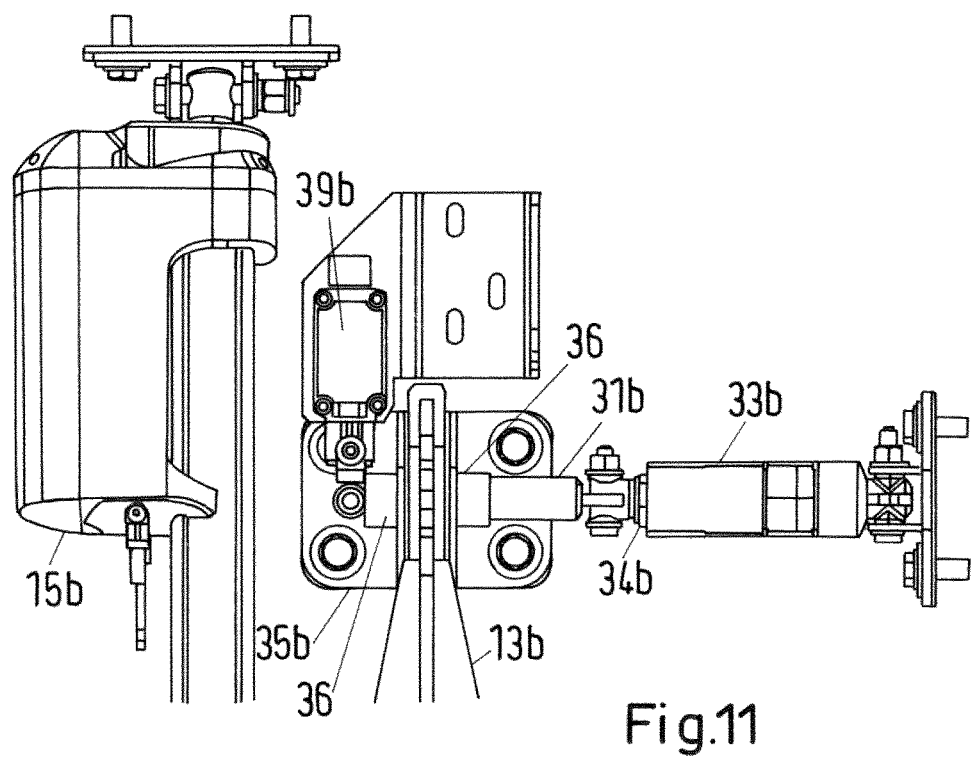

FIG. 10 and FIG. 11 show arrangements which are mirror-inverted. In particular, the arrangement shown in FIG. 11 may be an arrangement which is located on the right-hand side of the arrangement shown in FIG. 10. In this case, the protruding parts 13a of FIGS. 10 and 13b of FIG. 11 protrude from the same end of a pick-up portion (not shown in FIG. 10 and FIG. 11). This illustrates that a plurality of locking mechanisms are preferred in order to lock the pick-up portion safely in the predefined position.

While the arrangement in FIG. 10 shows the bolt 31a in the locked position of the locking mechanism, FIG. 11 shows the bolt 31b in the unlocked position. The locking drive 33a of FIG. 10 has pushed the piston 34a towards the sleeves 36 so that the bolt 31a has penetrated the reception of the protruding part 13a and the far-end sleeve 36 (the right sleeve in FIG. 10). The figure also shows the actuator 15a nearby the locking mechanism, the underside of the holder 35a which holds the sleeves 36 and the detector 39a in the position in which it detects the locked state.

In contrast, the bolt 31b is in the retracted position, in which only the end of the piston 34b is visible. Therefore, the bolt 31b only penetrates the nearer sleeve 36 (the right sleeve in FIG. 11). Again, a nearby actuator 15b for actuating movement of the pick-up portion (not shown) relative to the mounting portion is shown (on the left-hand side of FIG. 11). Also, the underside of the holder 35b which holds the sleeves 36 and the detector 39b for detecting the locked state are shown.

Figure 12:
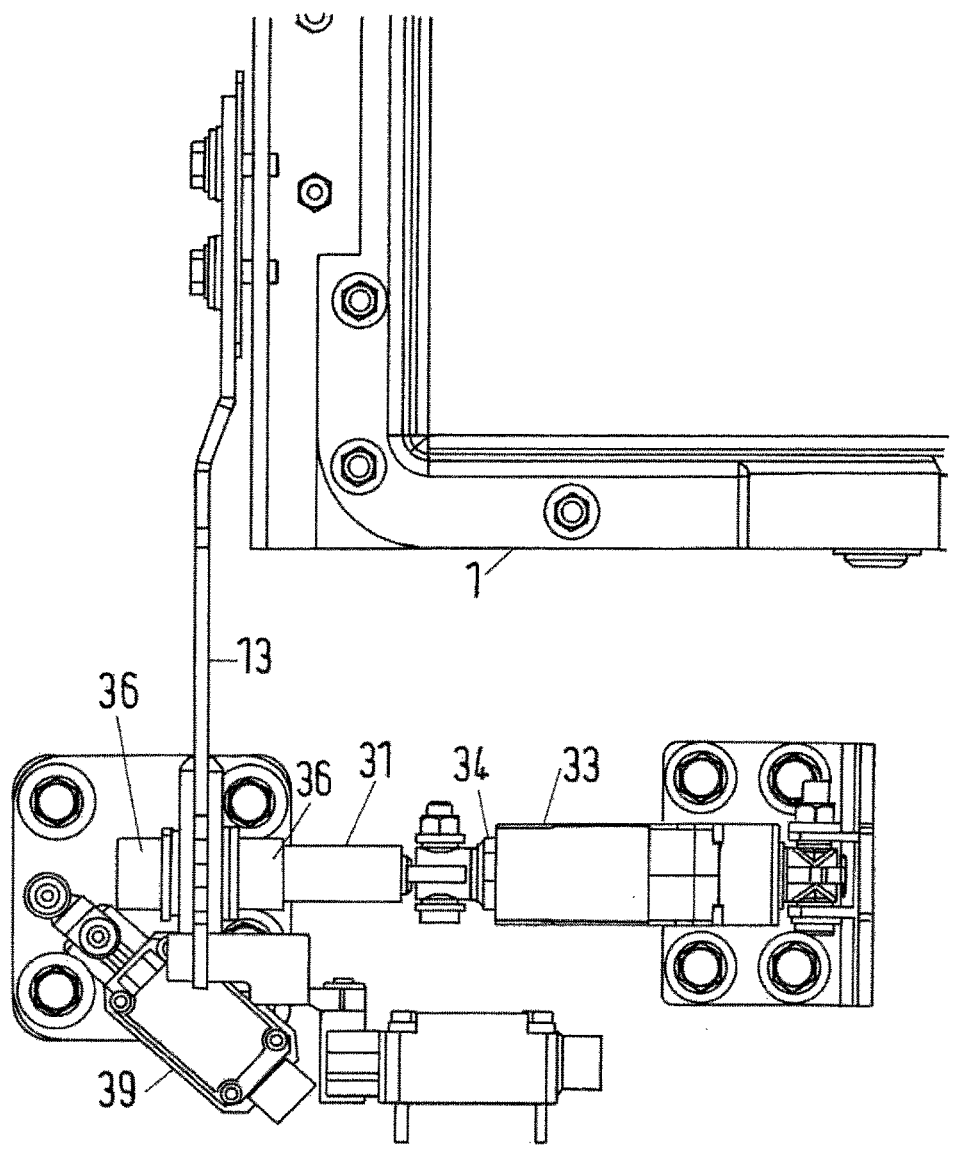

FIG. 12 shows the mirror-inverted situation of FIG. 8 from below. The detector 39 is in the state in which it detects that the locking mechanism has not locked the position of the pick-up portion 1. In this state, the bolt 31 is penetrating the nearer sleeve 36 only. The bolt 31 and the piston 34 are retracted by the locking drive 33.

Figure 13:
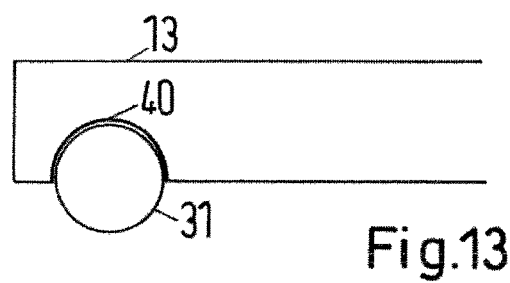

FIG. 13 shows the free end of the protruding part 13 schematically. The protruding part 13 has a semi-circular recess 40 for receiving the bolt 31 in the locked position. Since the pick-up portion is in the highest possible position (according to the preferred embodiment)—or alternatively is near the highest possible position—when the pick-up portion can be locked or is locked, the bolt 31 engages the protruding portion 13 in a manner which prevents the protruding portion 13 and thereby the pick-up portion to move downwards. Consequently, the pick-up portion is locked, since it cannot move downwards and since it is in or near the highest possible position (which is, for example, the position shown in FIG. 4).

It is an advantage of the locking mechanism that the actuator or actuators for actuating the movement of the pick-up portion can be switched of while the locking mechanism locks the position of the pick-up portion. For example, an electromotor of the actuator can be switched off, i.e. there is no electric current through the electromotor and there is no electric voltage at the connections of the electromotor.

The invention claimed is:

1. An inductive pick-up to be mounted on an electric vehicle which shall be operated with electric energy produced by the inductive pick-up by magnetic induction, wherein:
   the inductive pick-up comprises a pick-up portion comprising at least one electric inductance for receiving a magnetic field and for producing the electric energy,
   the inductive pick-up comprises a mounting portion to be mounted on the vehicle,
   the inductive pick-up comprises a linear actuator for actuating movement of the pick-up portion relative to the mounting portion,
   the mounting portion and the pick-up portion are moveably connected to each other by at least two connecting portions,
   wherein a distance between the pick-up portion and the mounting portion in a vertical direction can be varied by the linear actuator,
   wherein
   the linear actuator comprises a prolongable section which extends from a first bearing attached to the mounting portion to a second bearing attached to the pick-up portion and which can be prolonged and shortened by operating the linear actuator thereby prolonging or shortening a distance between the first bearing and the second bearing,
   the prolongable section comprises a first operating state in which the prolongable section is shorter than in a second operating state, so that the distance between the pick-up portion and the mounting portion is smaller in one of the first and second operating states than in the other of the first and the second operating states.

2. The inductive pick-up of claim 1, wherein each of the at least two connecting portions extends from a third bearing attached to the mounting portion to a fourth bearing attached to the pick-up portion, thereby connecting the mounting portion and the pick-up portion to each other, and wherein a first one of the at least two connecting portions and a second one of the at least two connecting portions are spaced apart from each other in a horizontal direction, so that the mounting portion, the pick-up portion, the first connecting portion and the second connecting portion form a parallelogram-like configuration.

3. The inductive pick-up of claim 2, wherein the distance between the first bearing and the second bearing has a component that extends in the horizontal direction and which varies during operation of the linear actuator.

4. The inductive pick-up of claim 1, wherein the distance between the pick-up portion and the mounting portion is smaller in the first operating state than in the second operating state.

5. The inductive pick-up of claim 1, wherein the prolongable section is adapted to be prolonged and shortened in a direction of a straight linear axis which extends from the first bearing to the second bearing.

6. The inductive pick-up of claim 1, wherein the inductive pick-up comprises a locking mechanism adapted to lock the pick-up portion in a predefined position relative to the mounting portion.

7. The inductive pick-up of claim 6, wherein the linear actuator is an electric linear actuator and the inductive pick-up is adapted to switch off the linear actuator while the pick-up portion is locked in the predefined position.

8. An electric land vehicle comprising the inductive pick-up of claim 1, wherein the inductive pick-up is mounted at the bottom of the vehicle, so that the pick-up portion can be moved by the linear actuator between a lower position, in which a distance between the pick-up portion and the mounting portion is larger, and a higher position, in which the distance between the pick-up portion and the mounting portion is smaller.

9. A method of operating an electric vehicle, wherein:
   an inductive pick-up portion, which is moveably connected to a mounting portion that is mounted at a bottom of the electric vehicle, is moved using a linear actuator between a lower position, in which a distance between the pick-up portion and the mounting portion is larger, and a higher position, in which the distance between the pick-up portion and the mounting portion is smaller,
   movement of the pick-up portion relative to the mounting portion is guided using at least two connecting portions which connect the pick-up portion and the mounting portion,
   wherein
   a prolongable section of the linear actuator, which prolongable section extends from a first bearing attached to the mounting portion to a second bearing attached to the pick-up portion, is prolonged or shortened while operating the linear actuator thereby prolonging or shortening a distance between the first bearing and the second bearing,
   by prolonging or shortening the prolongable section the distance between the pick-up portion to the mounting portion is varied.

10. The method of claim 9, wherein each of the at least two connecting portions extends from a third bearing attached to the mounting portion to a fourth bearing attached to the pick-up portion, and thereby connects the mounting portion and the pick-up portion to each other, and wherein a first one of the at least two connecting portions and a second one of the at least two connecting portions are spaced apart from each other in a horizontal direction, so that the mounting portion, the pick-up portion, the first connecting portion and the second connecting portion form a parallelogram-like configuration for guiding movement of the pick-up portion relative to the mounting portion.

11. The method of claim 10, wherein the distance between the first bearing and the second bearing has a component that extends in the horizontal direction and which varies during operation of the linear actuator.

12. The method of claim 9, wherein the distance between the pick-up portion and the mounting portion is smaller when the prolongable section is shorter and vice versa.

13. The method of claim 9, wherein the prolongable section is prolonged and shortened in a direction of a straight linear axis which extends from the first bearing to the second bearing.

14. The method of claim 9, wherein the pick-up portion is locked in a predefined position relative to the mounting portion.

15. The method of claim 14, wherein the linear actuator is an electric linear actuator and the linear actuator is switched off while the pick-up portion is locked in the predefined position.

* * * * *